United States Patent
Suo et al.

(10) Patent No.: US 11,302,280 B2
(45) Date of Patent: Apr. 12, 2022

(54) COMPENSATION METHOD AND COMPENSATION DEVICE FOR VR DISPLAY AND DISPLAY DEVICE

(71) Applicants: Beijing BOE Optoelectronics Technology Co., Ltd., Beijing (CN); BOE Technology Group Co., Ltd., Beijing (CN)

(72) Inventors: Jianwen Suo, Beijing (CN); Jingtao Xu, Beijing (CN); Xuefeng Wang, Beijing (CN); Wenyu Li, Beijing (CN); Jinghua Miao, Beijing (CN); Yakun Wang, Beijing (CN); Jinbao Peng, Beijing (CN); Bin Zhao, Beijing (CN); Zhifu Li, Beijing (CN); Xi Li, Beijing (CN); Qingwen Fan, Beijing (CN); Yukun Sun, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/254,981

(22) PCT Filed: Dec. 25, 2019

(86) PCT No.: PCT/CN2019/128273
§ 371 (c)(1),
(2) Date: Dec. 22, 2020

(87) PCT Pub. No.: WO2020/140808
PCT Pub. Date: Jul. 9, 2020

(65) Prior Publication Data
US 2021/0264872 A1     Aug. 26, 2021

(30) Foreign Application Priority Data

Jan. 2, 2019   (CN) .......................... 201910002157.0

(51) Int. Cl.
*G09G 5/00*     (2006.01)
*G06F 3/01*     (2006.01)

(52) U.S. Cl.
CPC ............. *G09G 5/005* (2013.01); *G06F 3/012* (2013.01); *G09G 2340/0435* (2013.01); *G09G 2350/00* (2013.01)

(58) Field of Classification Search
None
See application file for complete search history.

(56) References Cited

U.S. PATENT DOCUMENTS

| | | | | |
|---|---|---|---|---|
| 9,031,131 | B1* | 5/2015 | Patankar | ................ H04N 7/014 |
| | | | | 375/240.16 |
| 2011/0249135 | A1 | 10/2011 | Minato | |
| 2019/0237021 | A1* | 8/2019 | Peng | ........................ G06F 3/14 |

FOREIGN PATENT DOCUMENTS

| | | |
|---|---|---|
| CN | 101377917 A | 3/2009 |
| CN | 105825801 A | 8/2016 |

(Continued)

OTHER PUBLICATIONS

First Office Action dated Mar. 5, 2020, for corresponding Chinese application 201910002157.0.

(Continued)

*Primary Examiner* — Edward Martello
(74) *Attorney, Agent, or Firm* — Nath, Goldberg & Meyer; Joshua B. Goldberg

(57) ABSTRACT

A compensation method for VR display, a compensation device for VR display, and a display device are provided. The compensation method for VR display includes: calculating a first synchronization signal value to be output by a (Continued)

controller according to a rendering resolution, a rendering frame rate and bandwidth data of a display panel; comparing the first synchronization signal value with a pre-stored second synchronization signal value of the display panel; generating compensation image data between two adjacent frames of original image data in a case where a comparison result shows that the first synchronization signal value is greater than the second synchronization signal value; and compensating an image to be displayed according to generated compensation image data.

20 Claims, 3 Drawing Sheets

(56) References Cited

FOREIGN PATENT DOCUMENTS

| | | |
|---|---|---|
| CN | 106127843 A | 11/2016 |
| CN | 106658170 A | 5/2017 |
| CN | 108109570 A | 6/2018 |
| CN | 109545122 A | 3/2019 |
| JP | 2009060371 A | 3/2009 |

OTHER PUBLICATIONS

Second Office Action dated Sep. 9, 2020, for corresponding Chinese application 201910002157.0.

* cited by examiner

COMPENSATION METHOD AND COMPENSATION DEVICE FOR VR DISPLAY AND DISPLAY DEVICE

CROSS REFERENCE TO RELATED APPLICATIONS

This is a National Phase Application filed under 35 U.S.C. 371 as a national stage of PCT/CN2019/128273, filed Dec. 25, 2019, an application claiming the benefit of Chinese patent application No. 201910002157.0, filed on Jan. 2, 2019, the content of each of which is incorporated herein by reference in its entirety.

TECHNICAL FIELD

The present disclosure relates to the field of display technologies, and in particular to a compensation method for VR display (i.e., VR displaying), a compensation device for VR display, and a display device.

BACKGROUND

A VR (virtual reality) technology, which utilizes a simulation technology, a computer graphics human-machine interface technology, a multimedia technology, a sensing technology, a network technology, etc., may simulate a virtual environment and make a user be immersed in the virtual environment. The VR technology focuses on experience of the user, and may improve a visual effect of the user with an ultrahigh resolution, such that the experience of the user is rich and real.

SUMMARY

An aspect of the present disclosure provides a compensation method for VR display, including:
calculating a first synchronization signal value to be output by a controller according to a rendering resolution, a rendering frame rate and bandwidth data of a display panel;
comparing the first synchronization signal value with a pre-stored second synchronization signal value of the display panel;
generating compensation image data between two adjacent frames of original image data in a case where a comparison result shows that the first synchronization signal value is greater than the second synchronization signal value; and
compensating an image to be displayed according to generated compensation image data.

In an embodiment, the compensation image data between two adjacent frames of original image data that is generated in the case where the comparison result shows that the first synchronization signal value is greater than the second synchronization signal value is one frame of compensation image data;
the two adjacent frames of original image data are an N-th frame of original image data and an (N+1)-th frame of original image data, respectively, where N is an integer greater than or equal to 1;
the generating compensation image data between two adjacent frames of original image data includes:
acquiring estimated compensation image data according to the N-th frame of original image data and a preset number of frames of original image data that are continuous and previous to the N-th frame of original image data; and
calculating a compensation matrix according to an image acceleration of the N-th frame of original image data and the estimated compensation image data, thereby acquiring final compensation image data.

In an embodiment, the compensation image data between two adjacent frames of original image data that is generated in the case where the comparison result shows that the first synchronization signal value is greater than the second synchronization signal value is a plurality of frames of compensation image data;
the two adjacent frames of original image data are an N-th frame of original image data and an (N+1)-th frame of original image data, respectively, where N is an integer greater than or equal to 1;
the generating compensation image data between two adjacent frames of original image data includes:
acquiring a first frame of estimated compensation image data according to the N-th frame of original image data and a preset number of frames of original image data that are continuous and previous to the N-th frame of original image data;
calculating a compensation matrix of the first frame of estimated compensation image data according to an image acceleration of the N-th frame of original image data and the first frame of estimated compensation image data, thereby acquiring a first frame of final compensation image data;
acquiring an (M+1)-th frame of estimated compensation image data according to an M-th frame of final compensation image data and a preset number of frames of image data that are continuous and previous to the M-th frame of final compensation image data, where M is an integer greater than or equal to 1; and
calculating a compensation matrix of the (M+1)-th frame of estimated compensation image data according to an image acceleration of the M-th frame of final compensation image data and the (M+1)-th frame of estimated compensation image data, thereby acquiring an (M+1)-th frame of final compensation image data.

In an embodiment, a number of frames of the generated compensation image data is positively correlated with a difference between the first synchronization signal value and the second synchronization signal value.

In an embodiment, the calculating a first synchronization signal value to be output by a controller according to a rendering resolution, a rendering frame rate and bandwidth data of a display panel includes:
acquiring the rendering resolution, the rendering frame rate and the bandwidth data of the display panel;
calculating a rendering bandwidth according to the rendering resolution and the rendering frame rate of the display panel; and
calculating the first synchronization signal value to be output by the controller according to a formula of $1/B + A \times 24/(A-C)$, where A is the rendering bandwidth, B is the rendering frame rate, and C is the bandwidth data of the display panel.

In an embodiment, the calculating a rendering bandwidth according to the rendering resolution and the rendering frame rate of the display panel includes: calculating a product of the rendering resolution and the rendering frame rate as the rendering bandwidth.

In an embodiment, the second synchronization signal value is a fixed value of the display panel when the display panel leaves factory.

Another aspect of the present disclosure provides a dynamic compensation device for VR display, including:

a calculation unit, configured to calculate a first synchronization signal value to be output by a controller according to a rendering resolution, a rendering frame rate and bandwidth data of a display panel;

a comparison unit, configured to compare the first synchronization signal value with a pre-stored second synchronization signal value of the display panel;

a compensation image data generation unit, configured to generate compensation image data between two adjacent frames of original image data in a case where a result of comparison by the comparison unit shows that the first synchronization signal value is greater than the second synchronization signal value; and a compensation unit, configured to compensate an image to be displayed according to the compensation image data generated by the compensation image data generation unit.

In an embodiment, the compensation image data generation unit includes an estimation sub-unit, a compensation matrix calculation sub-unit, and a compensation image data generation sub-unit.

In an embodiment, the compensation image data between two adjacent frames of original image data that is generated by the compensation image data generation unit in the case where the result of comparison by the comparison unit shows that the first synchronization signal value is greater than the second synchronization signal value is one frame of compensation image data;

the two adjacent frames of original image data are an N-th frame of original image data and an (N+1)-th frame of original image data, respectively, where N is an integer greater than or equal to 1;

the estimation sub-unit is configured to acquire estimated compensation image data according to the N-th frame of original image data and a preset number of frames of original image data that are continuous and previous to the N-th frame of original image data;

the compensation matrix calculation sub-unit is configured to calculate a compensation matrix according to an image acceleration of the N-th frame of original image data and the estimated compensation image data acquired by the estimation sub-unit; and the compensation image data generation sub-unit is configured to generate final compensation image data according to the compensation matrix calculated by the compensation matrix calculation sub-unit.

In an embodiment, the compensation image data between two adjacent frames of original image data that is generated by the compensation image data generation unit in the case where the result of comparison by the comparison unit shows that the first synchronization signal value is greater than the second synchronization signal value is a plurality of frames of compensation image data;

the two adjacent frames of original image data are an N-th frame of original image data and an (N+1)-th frame of original image data, respectively, where N is an integer greater than or equal to 1;

the estimation sub-unit is configured to acquire a first frame of estimated compensation image data according to the N-th frame of original image data and a preset number of frames of original image data that are continuous and previous to the N-th frame of original image data, and acquire an (M+1)-th frame of estimated compensation image data according to an M-th frame of final compensation image data and a preset number of frames of image data that are continuous and previous to the M-th frame of final compensation image data, where M is an integer greater than or equal to 1;

the compensation matrix calculation sub-unit is configured to calculate a compensation matrix of the first frame of estimated compensation image data according to an image acceleration of the N-th frame of original image data and the first frame of estimated compensation image data, and calculate a compensation matrix of the (M+1)-th frame of estimated compensation image data according to an image acceleration of the M-th frame of final compensation image data and the (M+1)-th frame of estimated compensation image data estimated by the estimation sub-unit; and the compensation image data generation sub-unit is configured to generate a first frame of final compensation image data according to the compensation matrix, which is calculated by the compensation matrix calculation sub-unit, of the first frame of estimated compensation image data, and generate an (M+1)-th frame of final compensation image data according to the compensation matrix, which is calculated by the compensation matrix calculation sub-unit, of the (M+1)-th frame of estimated compensation image data.

In an embodiment, a number of frames of the compensation image data generated by the compensation image data generation unit is positively correlated with a difference between the first synchronization signal value and the second synchronization signal value.

In an embodiment, the calculation unit includes:

an acquisition sub-unit, configured to acquire the rendering resolution, the rendering frame rate and the bandwidth data of the display panel;

a first calculation sub-unit, configured to calculate a rendering bandwidth according to the rendering resolution and the rendering frame rate of the display panel; and a second calculation sub-unit, configured to calculate the first synchronization signal value to be output by the controller according to a formula of $1/B+A\times24/(A-C)$, where A is the rendering bandwidth, B is the rendering frame rate, and C is the bandwidth data of the display panel.

In an embodiment, the first computation sub-unit is configured to calculate a product of the rendering resolution and the rendering frame rate as the rendering bandwidth.

In an embodiment, the second synchronization signal value is a fixed value of the display panel when the display panel leaves factory.

In an embodiment, the compensation image data generation unit includes a sensor.

In an embodiment, the estimation sub-unit of the compensation image data generation unit includes a sensor.

In an embodiment, the sensor is a gyroscope.

Still another aspect of the present disclosure provides a display device, which includes the dynamic compensation device for VR display according to any one of the foregoing embodiments of the present disclosure and the display panel.

DETAILED DESCRIPTION

To enable one of ordinary skill in the art to better understand technical solutions of the present disclosure, the present disclosure will be further described in detail below with reference to the accompanying drawings and exemplary embodiments.

The inventors of the present inventive concept have found that, the requirement of real-time transmission of video or images with an ultra-high resolution may not be satisfied due to the reasons that the ultra-high resolution for VR display may cause a rendering time to be too long and a refresh rate to be reduced in the related art, and that the maximal video transmission rate of an interface in the related art is only 21.6 Gbps. These two reasons result in that it is impossible to achieve a VR product with the ultra-high resolution. In the related art, a display effect of the ultra-high resolution for the VR technology is limited by hardware and software, and thus display with a high frame rate and a high resolution cannot be achieved.

To solve at least the above technical problems in the related art, embodiments of the present disclosure provide a compensation method for VR display, a compensation device for VR display, and a display device including the compensation device for VR display.

Figure 1:
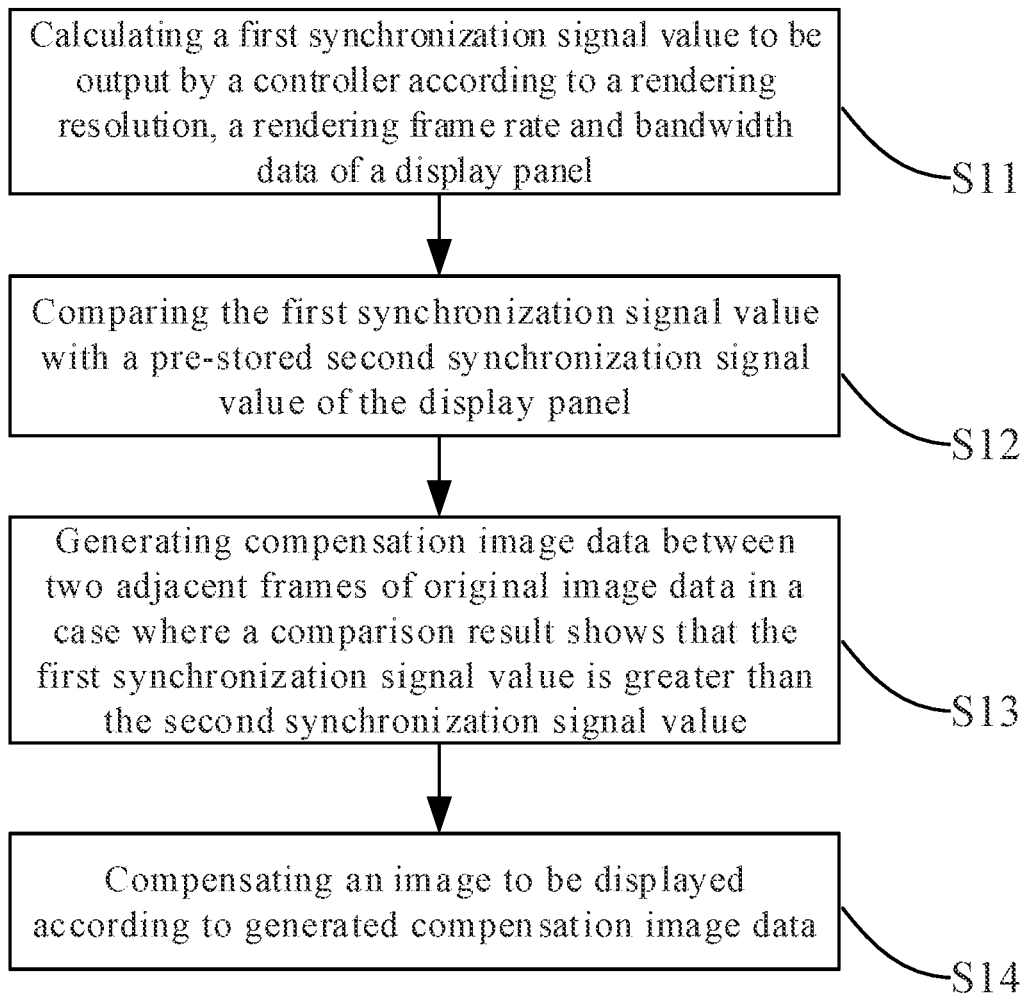
FIG. 1 is a schematic flowchart of a compensation method for VR display according to an embodiment of the present disclosure.

As shown in FIG. 1, the present embodiment provides a compensation method for VR display, and the compensation method may include the following steps S11 to S14.

In step S11, a first synchronization signal value (i.e., a value of a first synchronization signal) to be output by a controller is calculated according to a rendering resolution, a rendering frame rate, and bandwidth data (i.e., a bandwidth value) of a VR display panel.

In step S11, for the VR display panel (which may be simply referred to as "display panel" hereinafter), an arrangement of pixels thereof is fixed, and the rendering resolution and the rendering frame rate corresponding to the display panel are fixed. For example, the rendering resolution and rendering frame rate of the display panel are data provided by a software designer that designs software for VR display, and the bandwidth data is also a parameter inherent to the display panel (and for example, is provided by a manufacturer of the display panel and built (or embedded) in the display panel). Therefore, the rendering resolution, the rendering frame rate and the bandwidth data of the display panel may be acquired first, next are output to a calculation unit, and the calculation unit may calculate the first synchronization signal value to be output by the controller, i.e., calculate the first synchronization signal value for the software, according to the rendering resolution and the bandwidth data of the display panel.

It should be noted that the first synchronization signal herein refers to a vertical synchronization (Vsync) signal of the display panel at the rendering resolution, and is a pulse signal. The first synchronization signal value in the present embodiment may refer to a pulse width, i.e., a time value, of the first synchronization signal. Bandwidth data refers to the rate at which data is transmitted in the display panel. The controller may be a software layer of a display device including the display panel, and the display panel may be a hardware layer of the display device.

In step S12, the first synchronization signal value calculated in step S11 is compared with a second synchronization signal value (i.e., a value of a second synchronization signal), which is stored in advance, of the display panel. The second synchronization signal is a vertical synchronization (Vsync) signal of the display panel at a physical resolution of the display panel. That is, the second synchronization signal value is a fixed value of the display panel when being shipped (i.e., when the display panel leaves factory).

In step S12, the first synchronization signal value and the second synchronization signal value of the display panel that is stored in advance may be compared by a comparison unit, for example. When a result of the comparison shows that the first synchronization signal value is greater than the second synchronization signal value, step S13 is executed. When the result of the comparison shows that the first synchronization signal value is equal to the second synchronization signal value, which means that the transmission of the video signal of images to be displayed is not limited, and a displayed picture will not have defects such as unsmooth and the like, the transmission of the video signal may be carried out according to the first synchronization signal value without compensating the images to be displayed.

It should be noted that, since the rendering resolution of the display panel is greater than or equal to the physical resolution of the display panel, the first synchronization signal value calculated by the calculation unit is not less than the second synchronization signal value.

In step S13, when the result of the comparison shows that the first synchronization signal value is greater than the second synchronization signal value, compensation image data between two adjacent frames of original image data is generated. For example, each frame of original image data refers to each frame of image data of original images to be displayed. The compensation image data refers to a frame of image data to be inserted between the two adjacent frames of original image data.

Step S13 may further includes calculating a difference between the first and second synchronization signal values, and the difference between the first and second synchronization signal values determines the number of frames of the generated compensation image data. For example, the difference between the first synchronization signal value and the second synchronization signal value is positively correlated with the number of frames of the compensation image data. That is, the larger the difference between the first synchronization signal value and the second synchronization signal value is, the larger the number of frames of the generated compensation image data is.

In step S14, the images to be displayed are compensated according to the compensation image data generated in step S13.

In step S14, specifically, the compensation image data is inserted into the corresponding two adjacent frames of original image data to form image data to be displayed, and then, a picture is displayed according to the image data to be displayed. In this way, the compensation of the original display data is completed.

The rendering resolution and the rendering frame rate will have an influence on the display effect of the VR display device during the VR display device being in operation. When the VR display device is worn by a user, a rendering time may be excessively long to exceed the time period of one frame due to the rendering resolution and a motion of the head of the user, such that information displayed on the display panel may be delayed by at least one frame, resulting in a stop of the stream of displayed picture. In the compensation method for VR display provided by the present embodiment, a value (e.g., a pulse width) of a synchronization signal for software is first calculated at a software layer according to resolution information, and then whether to perform compensation is determined at a hardware layer according to the value of the synchronization signal transmitted by the software. In the case where compensation is not required, normal (or conventional) video signal processing is performed. In the case where compensation is required, a dynamic compensation algorithm for VR display provided by an embodiment of the present disclosure may for example be embedded into the hardware layer (e.g., the display panel), to generate compensation image data in the hardware layer, so as to reduce a transmission bandwidth requirement for transmitting a video signal (e.g., the original image data and the compensation image data) from the software layer to the hardware layer, and at the same time, reduce a rendering pressure. Thus, display (i.e., displaying) with a high resolution is achieved, and the user experience of VR display is improved, thereby avoiding the defects in the related art.

Figure 2:
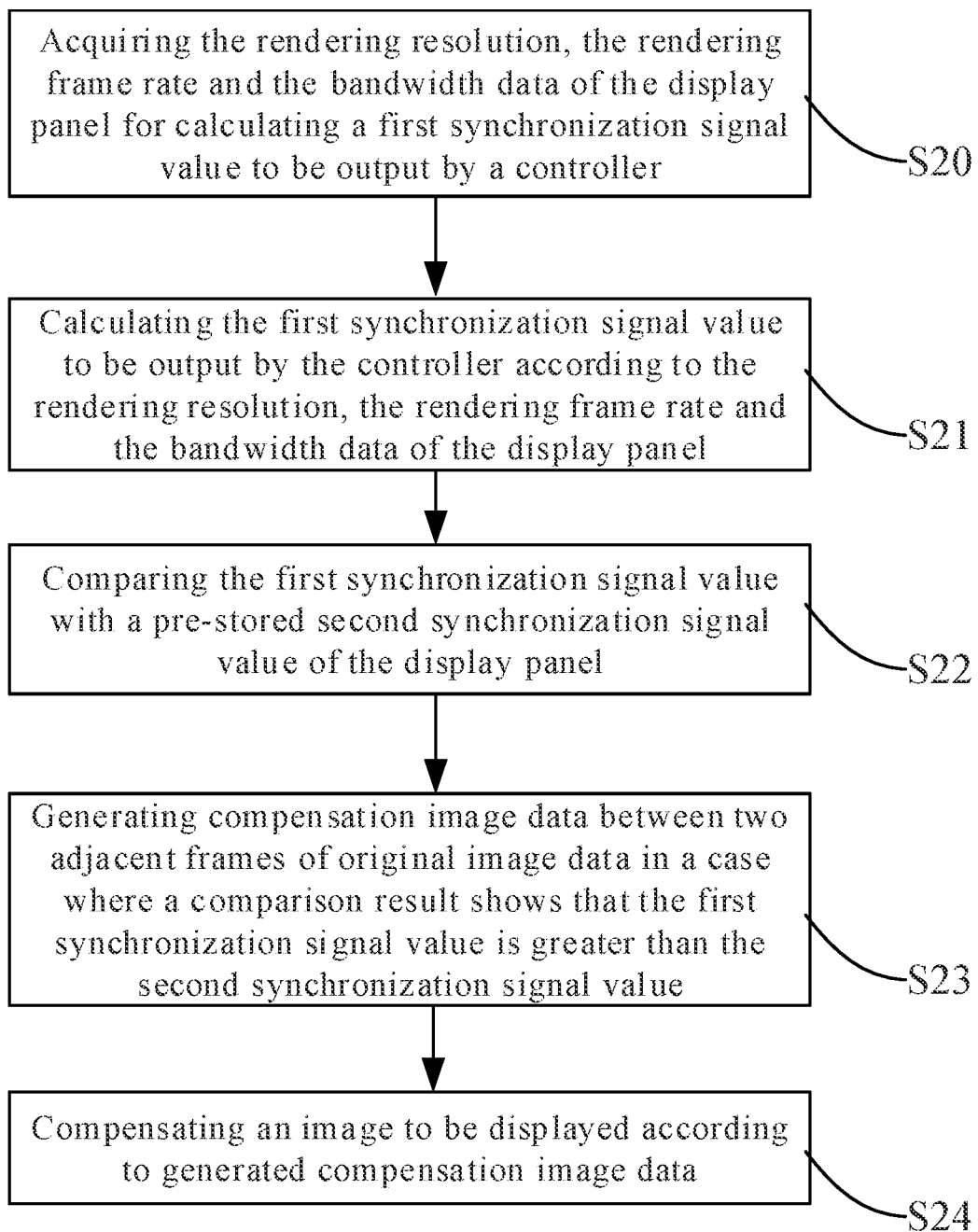
FIG. 2 is another schematic flowchart of a compensation method for VR display according to an embodiment of the present disclosure.

To enable the compensation method for VR display according to the present embodiment to be understood more clearly, the present embodiment of the present disclosure provides another compensation method. In the compensation method according to the present embodiment, the two adjacent frames of original image data may be an N-th frame of original image data and an (N+1)-th frame of original image data, respectively, where N is an integer greater than or equal to 1. As shown in FIG. 2, the compensation method may include the following steps S20 to S24.

In step S20, the rendering resolution, the rendering frame rate and the bandwidth data of the display panel are acquired.

For example, a software developer will provide some information desired by a user and data related to the display panel (e.g., the rendering resolution, the rendering frame rate, the bandwidth data, and the like of the display panel) to the user and embed (or set) them in the display panel. Therefore, in step S20, an acquisition sub-unit of a calculation unit of a compensation device (e.g., the dynamic compensation device for VR display described below with reference to each of FIGS. 3 and 4) may directly acquire the rendering resolution, the rendering frame rate, and the bandwidth data of the display panel.

In step S21, a first synchronization signal value to be output by a controller is calculated according to the rendering resolution, the rendering frame rate and the bandwidth data of the display panel acquired in step S20.

In step S21, a first calculation sub-unit of the calculation unit may calculate, according to the acquired rendering resolution and the acquired rendering frame rate, a rendering bandwidth of the display panel, i.e., a bandwidth required for transmitting the display data with the rendering resolution and the rendering frame rate. For example, the rendering bandwidth may be equal to the product of the acquired rendering resolution and the acquired rendering frame rate (e.g., the rendering frame rate being the number of frames rendered per second) (in this case, the calculated rendering bandwidth is in a unit of bits/second (bps)). In a case of performing color (e.g., including red R, green G and blue B) display, the rendering bandwidth may be equal to the acquired rendering resolution×the rendering frame rate× 24÷1024÷1024÷1024 (in this case, the calculated rendering bandwidth is in a unit of Gbps (gigabits per second)), where the number 24 means that the three primary colors R, G and B each include 8 bits. Next, the first synchronization signal value to be output by the controller may be calculated by a second calculation sub-unit according to the formula $1/B + A \times 24/(A-C)$, where A is the rendering bandwidth, B is the rendering frame rate, and C is the bandwidth data of the display panel.

In step S22, the first synchronization signal value calculated in step S21 is compared with a second synchronization signal value, which is stored in advance, of the display panel, and step S23 is performed if the first synchronization signal value is greater than the second synchronization signal value.

Figure 3:
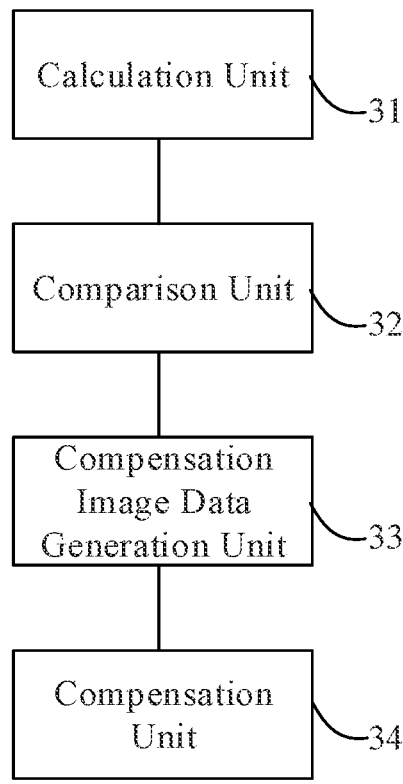
FIG. 3 is a schematic diagram showing a structure of a dynamic compensation device for VR display according to an embodiment of the present disclosure.
Figure 4:
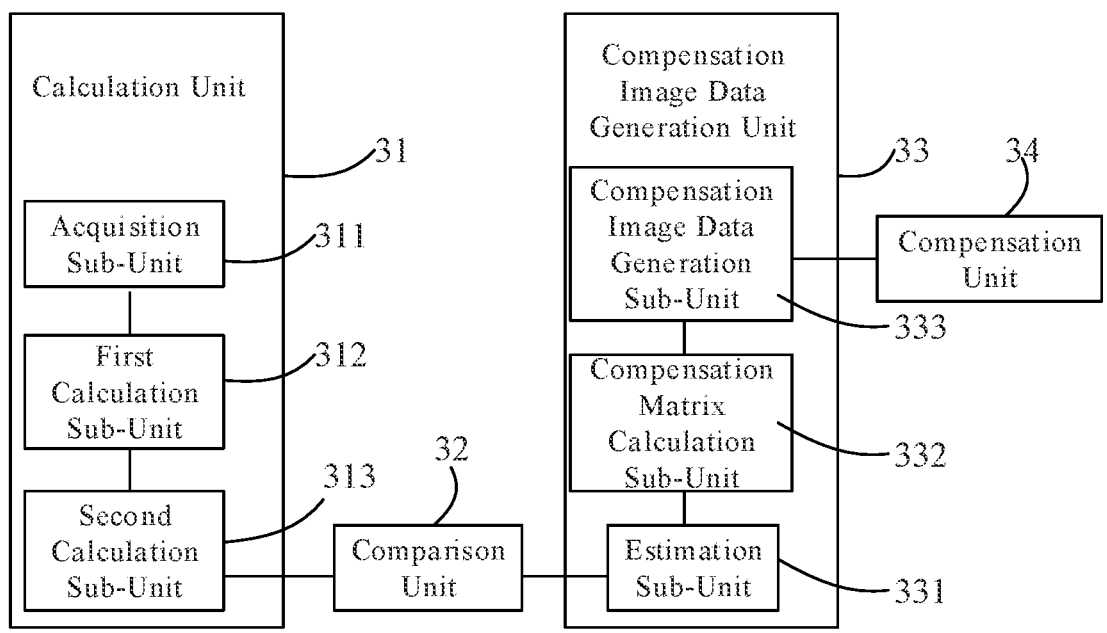
FIG. 4 is a schematic diagram showing another structure of a dynamic compensation device for VR display according to an embodiment of the present disclosure.

In step S22, the first synchronization signal value calculated in step S21 and the second synchronization signal value inherent to the display panel and stored in advance in a memory (e.g., of the display panel or the dynamic compensation device) may be compared with each other by a comparison unit of the dynamic compensation device for VR display shown in each of FIGS. 3 and 4.

In step S23, compensation image data between the N-th frame of original image data and the (N+1)-th frame of original image data is generated.

In step S23, firstly, a difference between the first synchronization signal value and the second synchronization signal value may be calculated, and the number of frames of the compensation image data to be generated may be determined according to the difference between the first synchronization signal value and the second synchronization signal value. For example, the difference between the first synchronization signal value and the second synchronization signal value may be positively correlated with the number of frames of the compensation image data to be generated. That is, the larger the difference between the first synchronization signal value and the second synchronization signal value is, the larger the number of frames of the compensation image data to be generated is. Next, description on how to generate the compensation image data will be made for the cases where the number of frames of the generated compensation image data is one and where the number of frames of the generated compensation image data is two or more, respectively.

On one hand, the case where the number of frames of the compensation image data to be generated is one will be described.

Firstly, an estimated compensation image data is acquired according to the N-th frame of original image data and a preset number of frames of original image data that are continuous and previous to the N-th frame.

For example, N may be 100 and the preset number of frames may be 10 frames, in this case the estimated compensation image data may be acquired by estimating through a sensor inside the display panel (i.e., the VR display panel) according to the 90-th to 100-th frames of original image data. In an embodiment, the sensor may be a gyroscope capable of acquiring motion data, which includes parameters such as a swing, a tilt, a yawing, and the like of the display panel (e.g., the VR display panel or a user wearing the VR display panel). Further, the sensor may acquire the estimated compensation image data based on, for example, the 90-th through 100-th frames of original image data and the motion data by using, for example, an asynchronous time warp technology known in the art.

Then, an image acceleration (i.e., an acceleration of an image) of the N-th frame of original image data may also be acquired by the sensor inside the display panel, and a texture coordinate (a data structure of the processed texture coordinate is a matrix) of the compensation image data may be calculated according to the image acceleration of the N-th frame of original image data and the estimated compensation image data, i.e., a compensation matrix may be acquired, so as to acquire the compensation image data (i.e., the final compensation image data) between the N-th frame of original image data and the (N+1)-th frame of original image data. In an embodiment, the display panel may include the sensor, and/or the dynamic compensation device for VR display may include the sensor, and the display device may include the display panel and/or the dynamic compensation device for VR display. The sensor moves as the user wearing the display device moves. Accordingly, an image displayed on the display device may have a movement speed and an acceleration. Herein, the "image acceleration" may refer to an acceleration of the movement of the sensor. Further, the "compensation matrix" may be an asynchronous time warp matrix (i.e., a matrix used in the asynchronous time warp technology). Further, the "compensation matrix" may be an N×1 matrix and includes matrix elements respectively representing parameters of the swing, the tilt, the yawing, and the like of the motion data.

For example, in step S23, the image acceleration of the N-th frame of original image data may be acquired by the sensor inside the display panel based on the N-th frame of original image data, and then the compensation matrix may be calculated according to the image acceleration of the N-th frame of original image data and the estimated compensation image data, so as to acquire the final compensation image data between the N-th frame of original image data and the (N+1)-th frame of original image data. For example, the final compensation image data may be image data acquired by transforming the compensation matrix according to the asynchronous time warp technology.

On the other hand, the case where the number of frames of the compensation image data to be generated is two or more will be described.

Firstly, a first frame of estimated compensation image data is acquired according to the N-th frame of original image data and a preset number of frames of original image data that are continuous and previous to the the N-th frame.

Specifically, N may be 100 and the preset number of frames may be 10 frames, and in this case, the first frame of estimated compensation image data may be acquired by the sensor inside the display panel according to the 90-th to 100-th frames of original image data (a method for acquiring may be the same as described above).

And then, similarly, an image acceleration of the N-th frame of original image data is acquired by the sensor in the display panel, and a texture coordinate (a data structure of the texture coordinate after it is processed is a matrix) of the first frame of estimated compensation image data is calculated according to the image acceleration of the N-th frame of original image data and the first frame of estimated compensation image data, i.e., a compensation matrix is acquired, thereby acquiring a first frame of final compensation image data.

Secondly, the value of N is changed (e.g., increased), and a second frame of final compensation image data, a third frame of final compensation image data . . . , and a K-th frame of final compensation image data are acquired in the same way as the first frame of final compensation image data is acquired, where K is an integer greater than or equal to 2.

Next, an (M+1)-th frame of estimated compensation image data is acquired through estimating by the sensor in the display panel according to the M-th frame of final compensation image data and a preset number of frames of image data that are continuous and previous to the M-th frame of final compensation image data, where M is an integer greater than or equal to 1 and less than or equal to K. It should be noted here that when M=1, the "preset number of frames of image data" in the first frame of final compensation image data and the preset number of frames of image data that are continuous and previous to the first frame of final compensation image data refers to the "preset number of frames of original image data" (that may be, in this example, the 91-st to 100-th frames of original image data) that are previous to the first frame of final compensation image data. When M>1, taking M=2 as an example, a "preset number of frames of image data" in the second frame of final compensation image data and the preset number of frames of image data that are continuous and previous to the second frame of final compensation image data refers to the first frame of final compensation image data and (the preset number−1) of frames of original image data (that may be, in this example, the first frame of final compensation image data and the 92-nd to 100-th frames of original image data) that are previous to the first frame of final compensation image data. The case where M is 3 or more may be understood as described above.

For example, if M=1, in this case, the second frame of estimated compensation image data is acquired through estimating by the sensor inside the display panel according to the first frame of final compensation image data and the 91-st to 100-th frames of original image data. Similarly, the third to the last (e.g., the K-th) frames of estimated compensation image data may be calculated in the same manner.

Finally, an image acceleration of the M-th frame of final compensation image data is acquired by the sensor inside the display panel, and a compensation matrix of the (M+1)-th frame of estimated image data is calculated according to the image acceleration of the M-th frame of final compensation image data and the (M+1)-th frame of estimated compensation image data, thereby acquiring the (M+1)-th frame of final compensation image data.

For example, taking M=1 as an example again, in this case, an image acceleration of the first frame of final compensation image data is acquired by the sensor inside the display panel according to the first frame of final compensation image data, and then the second frame of final compensation image data is acquired according to the image acceleration of the first frame of final compensation image data and the second frame of estimated compensation image data. Similarly, the third to the last (e.g., the K-th) frames of final compensation image data may be calculated in the same manner as described above.

In step S24, an image to be displayed is compensated by using the final compensation image data calculated in step S23.

In step S24, the frames of final compensation image data calculated in step S23 may be sequentially inserted by the compensation unit of the dynamic compensation device for VR display between the corresponding two adjacent frames of original image data, to compensate the image to be displayed. For example, the first frame of final compensation image data, the second frame of final compensation image data, the third frame of final compensation image data . . . may be sequentially inserted between the N-th frame of original image data and the (N+1)-th frame of original image data.

As shown in FIGS. 3 and 4, embodiments of the present disclosure provide a dynamic compensation device for VR display, which may implement the compensation method for VR display according to the embodiment shown in each of FIGS. 1 and 2. The dynamic compensation device for VR display according to the present embodiment may include: a calculation unit 31, a comparison unit 32, a compensation image data generation unit 33, and a compensation unit 34. For example, the calculation unit 31, the comparison unit 32, the compensation image data generation unit 33, and the compensation unit 34 may be implemented by using one central processing unit (CPU) or one application processor (AP), or may be implemented by using a plurality of central processing units or a plurality of application processors, respectively. For example, the dynamic compensation device for VR display may further include a memory (e.g., a non-volatile or non-transitory memory) in which one or more computer programs are stored, and the one or more computer programs when executed by the one or more central processing units or the one or more application processors, cause the one or more central processing units or the one or more application processors to function as the calculation unit 31, the comparison unit 32, the compensation image data generation unit 33, and the compensation unit 34. The memory may further store various data involved in the compensation method for VR display according to each of the embodiments of the present disclosure, such as the rendering resolution, the rendering frame rate, the bandwidth data, the first synchronization signal value to be output by the controller, the pre-stored second synchronization signal value of the display panel, a plurality of frames of original image data, estimated compensation image data, final compensation image data, and other required computer programs and information.

For example, the calculation unit 31 is configured to calculate the first synchronization signal value to be output by the controller, according to the rendering resolution, the rendering frame rate, and the bandwidth data of the display panel.

Specifically, the rendering resolution and rendering frame rate of the display panel are data provided by a designer of software for VR display, and the bandwidth data is an inherent parameter of the display panel. The calculation unit may include, for example, an acquisition sub-unit 311, a first calculation sub-unit 312, and a second calculation sub-unit 313, as shown in FIG. 4. For example, the acquisition sub-unit 311, the first calculation sub-unit 312, and the second calculation sub-unit 313 may be implemented by at least one central processing unit (or central processor) or application processor. The acquisition sub-unit 311 is configured to acquire the rendering resolution, the rendering frame rate, and the bandwidth data of the display panel. The first calculation sub-unit is configured to calculate the rendering bandwidth according to the rendering resolution and the rendering frame rate of the display panel. The second calculation sub-unit is configured to calculate the first synchronization signal value to be output by the controller, according to the formula 1/B+A×24/(A−C), where A is the rendering bandwidth (which is, for example, equal to the product of the rendering resolution and the rendering frame rate of the display panel), B is the rendering frame rate, and C is the bandwidth data (i.e., bandwidth value) of the display panel.

For example, the comparison unit 32 is configured to compare the first synchronization signal value with the second synchronization signal value, which is stored in advance (or the pre-stored second synchronization signal value), of the display panel.

For example, the compensation image data generation unit 33 is configured to generate compensation image data between two adjacent frames of original image data if a result of the comparison by the comparison unit 32 shows that the first synchronization signal value is greater than the second synchronization signal value. In an embodiment, the compensation image data generation unit 33 may include the sensor (which is, for example, a gyroscope).

Specifically, if the result of the comparison by the comparison unit 32 shows that the first synchronization signal value is greater than the second synchronization signal value, the compensation image data between two adjacent frames of original image data generated by the compensation image data generation unit 33 may be one frame of compensation image data, and the two adjacent frames of original image data may be the N-th frame of original image data and an (N+1) th frame of original image data, respectively, where N is an integer greater than or equal to 1. The compensation image data generation unit 33 may include: an estimation sub-unit 331, a compensation matrix calculation sub-unit 332, and a compensation image data generation sub-unit 333. For example, the estimation sub-unit 331, the compensation matrix calculation sub-unit 332, and the compensation image data generation sub-unit 333 may be implemented by at least one central processor or application processor. In an embodiment, the estimation sub-unit 331 may include the sensor (e.g., the gyroscope). For example, the estimation sub-unit 331 is configured to acquire estimated compensation image data according to the N-th frame of original image data and the preset number of frames of original image data that are continuous and previous to the N-th frame of original image data. The compensation matrix calculation sub-unit 332 is configured to calculate a compensation matrix according to the image acceleration of the N-th frame of original image data and the estimated compensation image data acquired by the estimation sub-unit. The compensation image data generation sub-unit 333 is configured to generate compensation image data according to the compensation matrix calculated by the compensation matrix calculation sub-unit.

Alternatively, when the result of the comparison by the comparison unit 32 shows that the first synchronization signal value is greater than the second synchronization signal value, the compensation image data between two adjacent frames of original image data that is generated by the compensation image data generation unit 33 may include a plurality of frames of compensation image data, and the two adjacent frames of original image data may be the N-th frame of original image data and the (N+1)-th frame of original image data, respectively.

In this case, the estimation sub-unit 331 is configured to acquire the first frame of estimated compensation image data according to the N-th frame of original image data and the preset number of frames of original image data that are continuous and previous to the N-th frame of original image data, where N is an integer greater than or equal to 1. Further, the estimation sub-unit 331 is further configured to acquire the (M+1)-th frame of estimated compensation image data according to the M-th frame of final compensation image data and a preset number of frames of image data that are continuous and previous to the M-th frame of final compensation image data, where M is an integer greater than or equal to 1. The compensation matrix calculation sub-unit 332 is configured to calculate a compensation matrix of the first frame of final compensation image data according to the image acceleration of the N-th frame of original image data and the first frame of estimated compensation image data, and calculate a compensation matrix of an (M+1)-th frame of estimated compensation image data according to the image acceleration of the M-th frame of final compensation image data and the (M+1)-th frame of estimated compensation image data estimated by the estimation sub-unit 332. The compensation image data generation sub-unit 333 is configured to generate the first frame of final compensation image data according to the compensation matrix of the first frame of estimated compensation image data calculated by the compensation matrix calculation sub-unit 332, and generate the (M+1)-frame of final compensation image data according to the compensation matrix of the (M+1)-th frame of estimated compensation image data calculated by the compensation matrix calculation sub-unit 332.

For example, the number of frames of the compensation image data (i.e., the final compensation image data) generated by the compensation image data generation unit 33 may be positively correlated with the difference between the first synchronization signal value and the second synchronization signal value.

In addition, the compensation image data generation unit 33 may alternatively be an FPGA (Field Programmable Gate Array, which is a logic programmable device), and in this case, the step implemented by the compensation image data generation unit 33 in the dynamic compensation method may be embedded in the FPGA to facilitate dynamic compensation of an image, thereby achieving high-frame-rate, smooth and complete VR display.

For example, the compensation unit 34 is configured to compensate an original image to be displayed according to the compensation image data (e.g., the final compensation image data) generated by the compensation image data generation unit 33. For example, the compensation unit 34 is configured to sequentially insert the one or more frames of final compensation image data between the N-th frame of original image data and the (N+1)-th frame of original image data, thereby completing compensation of the original image.

In the dynamic compensation device for VR display provided by the present embodiment, a value (e.g., pulse width) of a synchronization signal of the software is firstly calculated at a software layer according to the resolution information, and then, whether to perform dynamic compensation and normal video signal processing is determined at the hardware layer according to the value of the synchronization signal sent by the software. In this way, the requirement of the transmission bandwidth of the video signal is reduced, and the rendering pressure is reduced. Further, high-resolution display may be realized, and the user experience of VR display is improved.

Embodiments of the present disclosure provide a display device including the dynamic compensation device for VR display according to the embodiment shown in FIG. 3 or 4 and a display panel. Since the display device according to the present embodiment includes the dynamic compensation device for VR display according to the embodiment shown in FIG. 3 or 4, it may perform VR display with an ultra-high resolution.

By way of example, the display device may be an OLED (organic light emitting diode) display device or a liquid crystal display device, for example, any product or component with a display function, such as a liquid crystal panel, a mobile phone, a tablet computer, a television, a display, a notebook computer, a digital photo frame, a navigator, or the like.

The above-described embodiments of the present disclosure may be combined with each other in case of no explicit conflict.

It should be understood that the above embodiments are merely exemplary embodiments for illustrating the principle of the present disclosure, and the present disclosure is not limited thereto. It will be apparent to one of ordinary skill in the art that various changes and modifications may be made without departing from the scope of the present disclosure as defined in the appended claims, and such changes and modifications also fall within the scope of the present disclosure.

What is claimed is:

1. A compensation method for VR display, comprising:
calculating a first synchronization signal value to be output by a controller according to a rendering resolution, a rendering frame rate and bandwidth data of a display panel;
comparing the first synchronization signal value with a pre-stored second synchronization signal value of the display panel;
generating compensation image data between two adjacent frames of original image data in a case where a comparison result shows that the first synchronization signal value is greater than the second synchronization signal value; and
compensating an image to be displayed according to generated compensation image data.

2. The compensation method for VR display according to claim 1, wherein the compensation image data between two adjacent frames of original image data that is generated in the case where the comparison result shows that the first synchronization signal value is greater than the second synchronization signal value is one frame of compensation image data;
the two adjacent frames of original image data are an N-th frame of original image data and an (N+1)-th frame of original image data, respectively, where N is an integer greater than or equal to 1;
the generating compensation image data between two adjacent frames of original image data comprises:
acquiring estimated compensation image data according to the N-th frame of original image data and a preset number of frames of original image data that are continuous and previous to the N-th frame of original image data; and
calculating a compensation matrix according to an image acceleration of the N-th frame of original image data and the estimated compensation image data, thereby acquiring final compensation image data.

3. The compensation method for VR display according to claim 1, wherein the compensation image data between two adjacent frames of original image data that is generated in the case where the comparison result shows that the first synchronization signal value is greater than the second synchronization signal value is a plurality of frames of compensation image data;
the two adjacent frames of original image data are an N-th frame of original image data and an (N+1)-th frame of original image data, respectively, where N is an integer greater than or equal to 1;
the generating compensation image data between two adjacent frames of original image data comprises:
acquiring a first frame of estimated compensation image data according to the N-th frame of original image data and a preset number of frames of original image data that are continuous and previous to the N-th frame of original image data;
calculating a compensation matrix of the first frame of estimated compensation image data according to an image acceleration of the N-th frame of original image data and the first frame of estimated compensation image data, thereby acquiring a first frame of final compensation image data;
acquiring an (M+1)-th frame of estimated compensation image data according to an M-th frame of final compensation image data and a preset number of frames of image data that are continuous and previous to the M-th frame of final compensation image data, where M is an integer greater than or equal to 1; and calculating a compensation matrix of the (M+1)-th frame of estimated compensation image data according to an image acceleration of the M-th frame of final compensation image data and the (M+1)-th frame of estimated compensation image data, thereby acquiring an (M+1)-th frame of final compensation image data.

4. The compensation method for VR display according to claim 1, wherein a number of frames of the generated compensation image data is positively correlated with a difference between the first synchronization signal value and the second synchronization signal value.

5. The compensation method for VR display according to claim 1, wherein the calculating a first synchronization signal value to be output by a controller according to a rendering resolution, a rendering frame rate and bandwidth data of a display panel comprises:

acquiring the rendering resolution, the rendering frame rate and the bandwidth data of the display panel;

calculating a rendering bandwidth according to the rendering resolution and the rendering frame rate of the display panel; and calculating the first synchronization signal value to be output by the controller according to a formula of $1/B + A \times 24/(A−C)$, where A is the rendering bandwidth, B is the rendering frame rate, and C is the bandwidth data of the display panel.

6. The compensation method for VR display according to claim 5, wherein the calculating a rendering bandwidth according to the rendering resolution and the rendering frame rate of the display panel comprises: calculating a product of the rendering resolution and the rendering frame rate as the rendering bandwidth.

7. The compensation method for VR display according to claim 1, wherein the second synchronization signal value is a fixed value of the display panel when the display panel leaves factory.

8. A dynamic compensation device for VR display, comprising: at least one central processing unit (CPU) or at least one application processor (AP), and a memory having at least one computer program stored therein, wherein the at least one computer program, when executed by the at least one CPU or the at least one AP, causes the at least one CPU or the at least one AP to function as a calculation unit, a comparison unit, a compensation image data generation unit, and a compensation unit;

the calculation unit is configured to calculate a first synchronization signal value to be output by a controller according to a rendering resolution, a rendering frame rate and bandwidth data of a display panel;

the comparison unit is configured to compare the first synchronization signal value with a pre-stored second synchronization signal value of the display panel;

the compensation image data generation unit is configured to generate compensation image data between two adjacent frames of original image data in a case where a result of comparison by the comparison unit shows that the first synchronization signal value is greater than the second synchronization signal value; and the compensation unit is configured to compensate an image to be displayed according to the compensation image data generated by the compensation image data generation unit.

9. The dynamic compensation device for VR display according to claim 8, wherein the compensation image data generation unit comprises an estimation sub-unit, a compensation matrix calculation sub-unit, and a compensation image data generation sub-unit.

10. The dynamic compensation device for VR display according to claim 9, wherein the compensation image data between two adjacent frames of original image data that is generated by the compensation image data generation unit in the case where the result of comparison by the comparison unit shows that the first synchronization signal value is greater than the second synchronization signal value is one frame of compensation image data;

the two adjacent frames of original image data are an N-th frame of original image data and an (N+1)-th frame of original image data, respectively, where N is an integer greater than or equal to 1;

the estimation sub-unit is configured to acquire estimated compensation image data according to the N-th frame of original image data and a preset number of frames of original image data that are continuous and previous to the N-th frame of original image data;

the compensation matrix calculation sub-unit is configured to calculate a compensation matrix according to an image acceleration of the N-th frame of original image data and the estimated compensation image data acquired by the estimation sub-unit; and the compensation image data generation sub-unit is configured to generate final compensation image data according to the compensation matrix calculated by the compensation matrix calculation sub-unit.

11. The dynamic compensation device for VR display according to claim 9, wherein the compensation image data between two adjacent frames of original image data that is generated by the compensation image data generation unit in the case where the result of comparison by the comparison unit shows that the first synchronization signal value is greater than the second synchronization signal value is a plurality of frames of compensation image data;

the two adjacent frames of original image data are an N-th frame of original image data and an (N+1)-th frame of original image data, respectively, where N is an integer greater than or equal to 1;

the estimation sub-unit is configured to acquire a first frame of estimated compensation image data according to the N-th frame of original image data and a preset number of frames of original image data that are continuous and previous to the N-th frame of original image data, and acquire an (M+1)-th frame of estimated compensation image data according to an M-th frame of final compensation image data and a preset number of frames of image data that are continuous and previous to the M-th frame of final compensation image data, where M is an integer greater than or equal to 1;

the compensation matrix calculation sub-unit is configured to calculate a compensation matrix of the first frame of estimated compensation image data according to an image acceleration of the N-th frame of original image data and the first frame of estimated compensation image data, and calculate a compensation matrix of the (M+1)-th frame of estimated compensation image data according to an image acceleration of the M-th frame of final compensation image data and the (M+1)-th frame of estimated compensation image data estimated by the estimation sub-unit; and the compensation image data generation sub-unit is configured to generate a first frame of final compensation image data according to the compensation matrix, which is calculated by the compensation matrix calculation sub-unit, of the first frame of estimated compensation image data, and generate an (M+1)-th frame of final compensation image data according to the compensation matrix, which is calculated by the compensation matrix calculation sub-unit, of the (M+1)-th frame of estimated compensation image data.

12. The dynamic compensation device for VR display according to claim 8, wherein a number of frames of the compensation image data generated by the compensation image data generation unit is positively correlated with a difference between the first synchronization signal value and the second synchronization signal value.

13. The dynamic compensation device for VR display according to claim 8, wherein the calculation unit comprises:
- an acquisition sub-unit, configured to acquire the rendering resolution, the rendering frame rate and the bandwidth data of the display panel;
- a first calculation sub-unit, configured to calculate a rendering bandwidth according to the rendering resolution and the rendering frame rate of the display panel; and
- a second calculation sub-unit, configured to calculate the first synchronization signal value to be output by the controller according to a formula of $1/B+A\times24/(A-C)$, where A is the rendering bandwidth, B is the rendering frame rate, and C is the bandwidth data of the display panel.

14. The dynamic compensation device for VR display according to claim 13, wherein the first computation sub-unit is configured to calculate a product of the rendering resolution and the rendering frame rate as the rendering bandwidth.

15. The dynamic compensation device for VR display according to claim 8, wherein the second synchronization signal value is a fixed value of the display panel when the display panel leaves factory.

16. The dynamic compensation device for VR display according to claim 8, wherein the compensation image data generation unit comprises a sensor.

17. The dynamic compensation device for VR display according to claim 9, wherein the estimation sub-unit of the compensation image data generation unit comprises a sensor.

18. The dynamic compensation device for VR display according to claim 16, wherein the sensor is a gyroscope.

19. A display device, comprising the dynamic compensation device for VR display according to claim 8 and the display panel.

20. The dynamic compensation device for VR display according to claim 9, wherein the calculation unit comprises:
- an acquisition sub-unit; configured to acquire the rendering resolution, the rendering frame rate and the bandwidth data of the display panel;
- a first calculation sub-unit, configured to calculate a rendering bandwidth according to the rendering resolution and the rendering frame rate of the display panel; and
- a second calculation sub-unit, configured to calculate the first synchronization signal value to be output by the controller according to a formula of $1/B+A\times24/(A-C)$, where A is the rendering bandwidth, B is the rendering frame rate, and C is the bandwidth data of the display panel.

* * * * *